Figure 1:
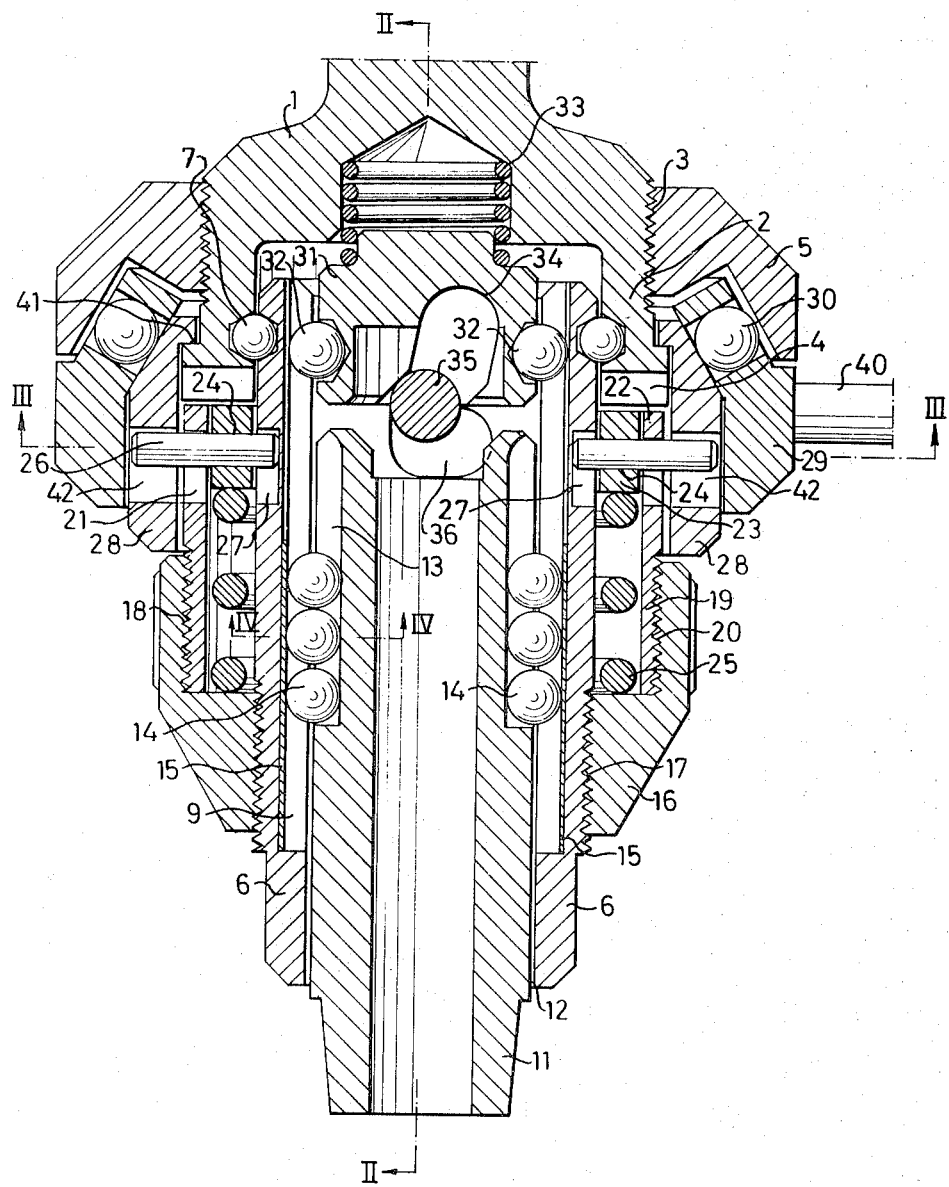

United States Patent [19]

Alfredeen

[11] 3,831,214
[45] Aug. 27, 1974

[54] THREAD CUTTING APPARATUS

[75] Inventor: Uno Allan Alfredeen, Osmo, Sweden

[73] Assignee: Scandinavian Paper Converting AB, Osmo, Sweden

[22] Filed: Mar. 21, 1973

[21] Appl. No.: 343,530

[30] Foreign Application Priority Data

March 29, 1972 Sweden.......................... 4083/72

[52] U.S. Cl............. 10/89 H, 10/135 R, 10/141 H, 74/205
[51] Int. Cl............................................. B23g 3/00
[58] Field of Search......... 74/205; 10/135 R, 136 R, 10/89 H, 141 H, 129 R

[56] References Cited
UNITED STATES PATENTS

| | | | |
|---|---|---|---|
| 2,405,772 | 8/1946 | Adams et al. | 10/89 H |
| 2,635,260 | 4/1953 | Chapin | 10/135 R |
| 2,795,146 | 6/1957 | Alfredeen | 74/205 |
| 3,011,185 | 12/1961 | Khachigian | 10/129 R |
| 3,041,893 | 7/1962 | Johnson | 74/205 |
| 3,371,364 | 3/1968 | Johnson | 10/89 H |

FOREIGN PATENTS OR APPLICATIONS 427,054   6/1925   Germany .......................... 10/89 H

*Primary Examiner*—Samuel Scott
*Assistant Examiner*—Allan Russell Burke
*Attorney, Agent, or Firm*—Richards & Geier

[57] ABSTRACT

A thread cutting apparatus includes a driving member, a driven member, connecting means driving the driven member in one direction and having a bolt which is movable axially and is rotatable relatively to the driving member, and a sleeve carrying the driven member and extending axially to the driving member, the bolt engaging by spring action in a recess provided in the driving member and extending to L-shaped slots provided in the sleeve. When a resistance of the driven member is exceeded, the bolt is forced out of the recess, so that it is disengaged from the driving member, thus disengaging the driving member from the driven member. The bolt is also adapted to engage a bearing connected with the driven member and having a roller path. A bearing ring has a second roller path, whereby the driven member is caused to rotate in a direction opposite to that of the driving member.

8 Claims, 7 Drawing Figures

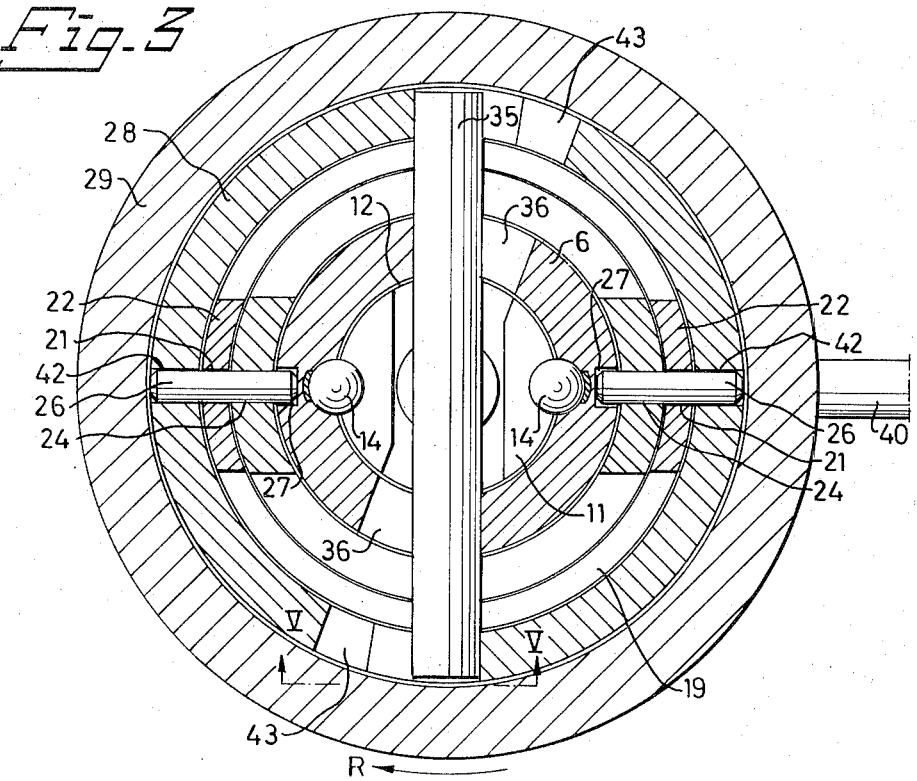
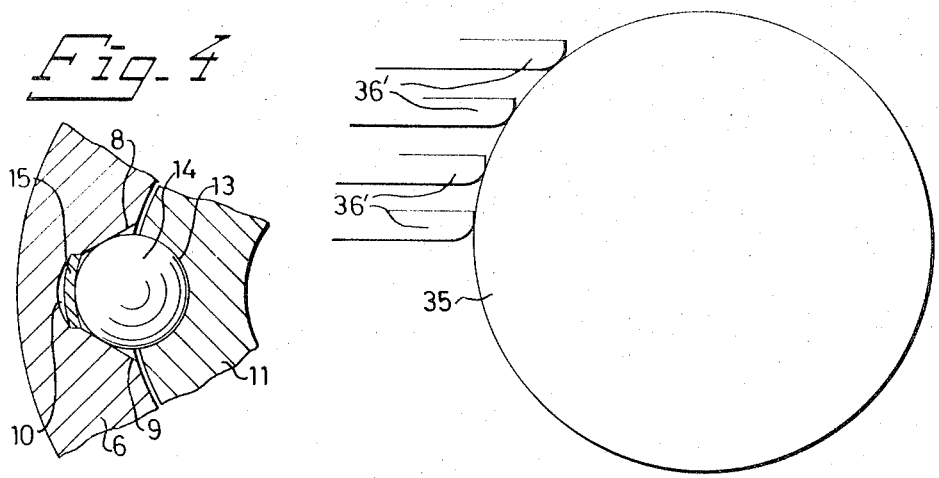

THREAD CUTTING APPARATUS

The speed at which thread cutting tools are required to work is increasing from day to day. A consequence of this is that working speed is also progressively increasing.

It must be possible to adapt thread cutting apparatus to different thread cutting operations, such as to enable them to transmit different torques as different thread dimensions and depth in different material, both simply and quickly. The lack of trained personnel increases instead with the increased requirement on the thread cutting apparatus.

It must also be possible to use the thread cutting apparatus with different types of working machines without requiring time-consuming adjustment of the apparatus, for example when applied to small non-reversible drilling machines, to large reversible working machines so-called radial boring machines, vertical boring machines, jig boring machines, etc., fully and semi-automatic machines and with numerically controlled programmed machines.

To fulfill all of these requirements, the apparatus must be as short as possible in its axial direction, without restricting therewith the axial movement of the apparatus tool. It must be possible to reverse the apparatus automatically when, for example, the thread cutting tool has reached the bottom of the prebored hole without any supplementary movement of the spindle carrying the apparatus. Neither should axial forces originating from the spindle affect the axially freely movable spindle carrying the tool when reversing the spindle.

The requirements are not fulfilled with mechanical thread cutting apparatus known to the art hitherto.

An object of the invention is to provide a thread cutting apparatus which fulfills the aforementioned requirements. According to the invention there is provided a thread cutting apparatus comprising a driving member and a driven member, and torque, transmitting means arranged between said members and comprising connecting means for directly driving the driven member in one direction, and intermediate means for driving the driven member in the opposite direction, said intermediate means being journalled for rotation in a holder element which is stationary from the rotation aspect and which moves between mutually opposing roller paths arranged on the driving and the driven member respectively, wherein the connecting means comprises a bolt in the form of one or more parts extending transversely of the axial direction of the apparatus and being arranged for movement in said axial direction of said apparatus and for rotation relative the driving member, and wherein a sleeve extends axially in relation to the driving member and is fixed against axial movement but mounted for rotatable movement, the driven member being arranged in said sleeve for axial movement but locked against rotary movement, the bolt being arranged in one limit position to engage under spring bias in a recess in the driving member and extending to L-shaped slots disposed in the sleeve, the slots having first portions extending in the direction of rotation of the driving member and arranged so that, when exceeding a certain resistance of the driven member, the bolt as a result of co-operation between the recesses and the slots is forced to move axially against the spring force out of the recesses and under friction to move into said first portions of respective slots, whereby to disengage the bolt from the driving member and hence disengage said driving member from the driven member, the bolt also being arranged to engage a bearing ring connected with the driven member and accomodating a roller path, so that when said bolt moves into said portion of respective slots it forces the roller path towards the intermediate means and against a bearing ring which accommodates a second roller path, said bearing ring being arranged at the driving member whereby the driven member is caused to rotate in a direction opposite to that of the driving member.

Figure 2:
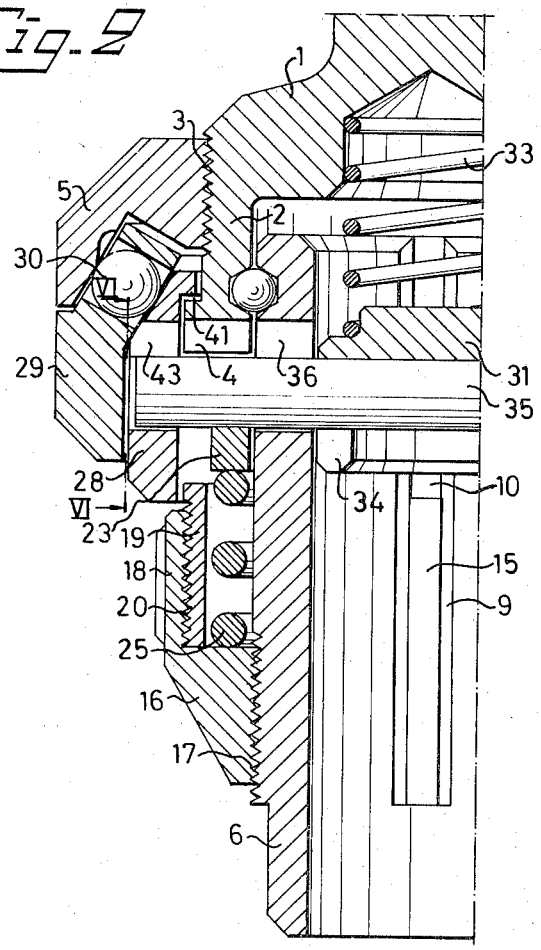
Figure 5:
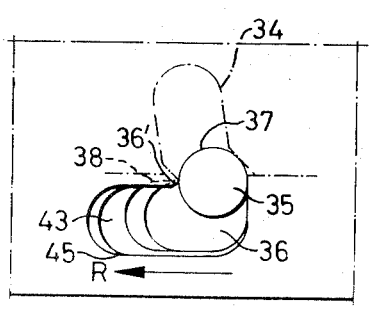
Figure 6:
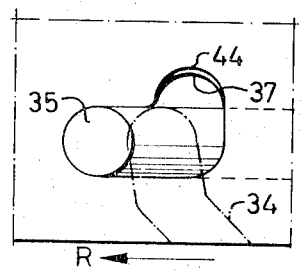

The invention will now be described in more detail with reference to embodiments thereof illustrated in the accompanied drawing, where FIG. 1 is a longitudinal sectional view of a thread cutting apparatus according to the invention, FIG. 2 is a longitudinal sectional view turned through 90° in relation to FIG. 1 and illustrating the apparatus in a different condition, FIG. 3 illustrates the apparatus diagrammatically and is a sectional view taken through the line 3 — 3 in FIG. 1, FIG. 4 is a part sectional view through the line 4 — 4 in FIG. 1, FIG. 5 illustrates diagrammatically an element of the apparatus seen in the direction of arrows 5 — 5 in FIG. 3, FIG. 6 is a view corresponding to that of FIG. 5 as seen in the direction of arrows 6 — 6 in FIG. 2, and FIG. 7 illustrates the disengaging function of the apparatus.

The apparatus, which in FIGS. 1 and 2 is illustrated in an upright position, comprises a spindle 1 terminated at the bottom with an axial flange 2 provided externally thereof with threads 3. The downwardly facing edge of the flange 2 is provided with part circular recesses 4 diametrically opposing each other in pairs, the number of recesses being four. Screwed onto the thread 3 of the flange 2 is an outer bearing ring 5. A cylindrical sleeve 6 extends into the flange 2 of the spindle 1 and is freely rotatable and axially fixed in relation to the spindle 1. This is achieved through opposing grooves arranged in the inside of the flange 2 and the outside of the sleeve 6 respectively, balls 7 engaging said grooves. As will be seen from FIGS. 4 and 3 for example, the sleeve 6 is provided on the inside thereof with two channels 8. The channels 8, which are formed as ball races 9, are provided at the bottom thereof with a groove 10. Arranged in the sleeve 6 is a tool spindle 11 having at the top thereof grooves or ball races 13 corresponding to the channel 8, although no notches are provided in the spindle 11. The tool spindle has a diameter which is smaller than the inner diameter of the sleeve 6 and is journalled in the sleeve by means of balls 14 which run in co-operating pairs of channels 8 and 13. In this way the tool spindle 11 is able to move axially but is held against rotary movement in the sleeve 6. Arranged in each groove 10 of the channels 8 is a leaf spring 15 which, as seen from FIG. 4, acts upon the balls 14. The balls are thus clamped between respective channels 13 and spring 15 and, owing to the bias exerted by the spring 15, are synchronized with the vertical movements of the tool spindle 11, i.e., the balls 14 will roll in their co-operating grooves 8, 13. As a result of the specific clearance 12 between the sleeve 6 and the tool spindle 11, the possibility is ensured that a certain degree of parallel movement and/or oblique positioning of the apparatus relative to the tool can be obtained.

Screwed onto the lower portion of the sleeve 6 is a sleeve 16 having a left-hand thread 17. An annular ring 19 having a right-hand thread 20 is screwed onto the upper collar-like portion 18 of the sleeve 16. The pitch of thread 17 is greater than the pitch of thread 20. The ring 19 has two diametrically opposed lugs 22, each of which has an axially extending groove 21. Arranged between the ring 19 and the sleeve 6 is another ring 23 which has two diametrically opposed lugs each of which has disposed therein a hole 24. The ring 23 is urged upwardly by a coil spring 25 engaging the sleeve 16, this upward movement of the ring being restricted by pegs 26 which extend from axial grooves 27 in the cylindrical sleeve 6 through the holes 24 of the rings 23 and through the annular ring 19, within the vertical grooves 21 thereof, movement of the pegs 26, and therewith the ring 23, is restricted relative to the sleeve 6. A piston 31 is arranged at the top of the cylindrical sleeve 6 for longitudinal movement within said sleeve and is locked against rotation relative to the sleeve 6 by means of two balls 32 running in two of the channels 8. The piston is biased downwardly by a coil spring 33, the spring force of which is smaller than the force of spring 25. The piston 31 is provided with two opposing recesses 34 open at the bottom of the piston, each of the recesses being formed at an angle (see FIG. 1). Extending between the flange 2 of the spindle 1 and the other edge of the ring 23 and between the lugs 22 is a bolt 35 which passes into the recess 4 on the flange 2 and through the sleeve 6 into diametrically opposed slots 36 disposed in said sleeve. Each of the slots 36 has a vertical portion 37 the length of which corresponds to half the diameter of the bolt 35, and a horizontal portion 38 located beneath said vertical portion 37 and having a height corresponding to the bolt diameter and extending from the vertical portion in the direction in which it is intended to drive the apparatus. The slot 36 when seen in horizontal section through its horizontal portion 38 (FIGS. 3 and 5) has in principle the form of part of a sector, the horizontal portion 38 of the slot on the inside of the sleeve having a length corresponding to at least half the bolt diameter. Between the horizontal portion 38 and the vertical portion 37 of the slot is formed a knee 36' and the vertical portion 37 on the side lying against the knee 36' is cylindrical in shape and has a diameter corresponding to the diameter of the bolt. The upper edge of the ring 23 extending between the lugs lies against the bolt 35 and, with the assistance of the spring 25, presses the bolt upwards into the vertical portion 37 of the slots 36 (FIG. 1).

When the spindle 1 and flange 2 are rotated in the direction of the arrow R, the rotary movement is transmitted via the bolt 35 lying in the recess 4 and the vertical portions 37 of the slot 36 in the sleeve 6 respectively to said sleeve, which in turn transmits the movement via the balls 14 to the tool spindle 11, said spindle having attached thereto a tool, such as a thread cutting tool for example.

This is the normal movement transmission sequence during the actual thread cutting operation, provided that the thread cutting tool is not impeded in the prebored hole during its cutting action and naturally under the assumption that the spindle 11 does not contact the spindle 1.

Movement of the thread cutting tool is braked when the tool reaches the bottom of the prebored hole. Thus, the tool spindle 11 and also the sleeve 6 will exert a certain resistance to the bolt 35. Since, owing to the fact that it is driven continuously, the spindle 1 continues to rotate, the shear force acting between the flange 2 and the sleeve 6, i.e., the force taken up by the bolt 35, will increase. When this shear force is sufficiently high, which takes place practically instantly, the bolt 35 is urged, by the co-action between the recess 4 of the flange 2 and the knee 36' of the slots 36, down against the spring force exerted by the spring 25 via the ring 23, and enters with a slide or rolling friction into the horizontal portion 38 of the slot 36. In this way, the upper surface of the bolt 35 is moved out of the recesses 4 to a position below the lower edge of the flange 2, wherewith the tool is disengaged from the driving spindle 1.

The shear force, ie., the resistance, required to force the bolt 35 down into the horizontal portion 38 of the slots 36 is dependent on the force exerted by the spring 25 and the point of engagement of the knee 36' of respective slots 36 on the surface of the bolt 35. The significance of the point of engagement of the knee with the bolt is illustrated diagrammatically in FIG. 7. FIG. 7 illustrates four different points, or actually lines of engagement for respective knees 36' with the bolt 35. The figure also illustrates lines passing tangentially through the points of engagement, wherewith it can readily be seen that the more the shear force is directed radially, i.e., the closer the knee 36' engages to the horizontal diameter of the bolt 35, the greater is the shear force or braking moment required for the bolt 35 to be forced downwardly with the same spring force.

In accordance with the invention, it is possible by adjusting the spring force acting on the bolt 35 and the points of engagement with the knee 36' on the bolt, to regulate the magnitude of the force which disengages the tool from the drive. This adjustment is effected in the following manner: As previously mentioned, the bolt 35 extends between the flange 2 and the ring 23. By screwing the collar sleeve 16 downwardly around the sleeve 6 (left-hand thread), the cylinder ring 19 will be screwed down into the sleeve 16 (right-hand thread) due to the fact that the ring 19 is locked by the pegs 26 against rotation relative to the sleeve 6 and therewith also the sleeve 16. Since the pitch of the thread 17 is greater than the pitch of the thread 20, the ring 19 will move through a correspondingly shorter distance than the sleeve 16, whereby the spring 25 extending between the sleeve 16 and the ring 23, whose upper limit as has previously been mentioned, is defined by the ring 19, will expand and therewith reduce the spring tension against the ring 23. Downward movement of the ring 19 is transmitted via the pegs 26 to the ring 23, which is therewith lowered in relation to the flange 2. The bolt 35, resting on the upper edge of the ring 23 and being constantly pressed downwards by the spring 33 via the piston 31 as described in more detail hereinafter, accompanies said downward movement, whereby the points of engagement of the knees 36' in the slot 36 relative the bolt 35 will be moved upwards. In this way a simultaneous adjustment of both the spring force acting on the bolt 35 and the points at which the shear force acts on the bolt 35 have been effected. As a result of this simultaneous change in the spring force and application point of the shear force a wide variation in the adjustment of the force at which it is desired that the tool is disengaged from the drive is possible.

During a thread cutting sequence, the piston 31 engages the bolt 35 with one side of the respective recesses 34 with a certain force, created by the spring 33. When the bolt 35 is rotated into the horizontal portion 38 of the slot 36, as previously described, the piston 31 can be moved downwardly with the recesses 34 surrounding the bolt 35, as will be evident from FIG. 1.

A bearing ring 28 is mounted for restricted axial movement at the flange 2 of the spindle 1. Between the ring 28 and the outer ring 5 is arranged a ball holder 29 having balls 30 arranged therewith. The ball holder 29 is fixed against rotation in space by means of an arm or the like 40. As shown in FIGS. 1 and 2, axial movement of the bearing ring 28 is restricted upwardly by the balls 30 and downwardly by mutually coacting collars 41 formed on the bearing ring 28 and the flange 2 respectively. Arranged in the bearing ring 28 are two diametrically opposed, axially extending elongate grooves 42 which accomodate the pegs 26. Two diametrically opposed slots 43 are provided for accomodating the bolt 35. The configuration of the slots 43 corresponds in principle to the configuration of the slots 36, see FIGS. 5, 6, i.e., each slot has a vertical portion 44 and a horizontal portion 45 extending in the drive direction of the apparatus.

With the illustrated embodiment, when the thread cutting tool reaches the bottom of the preboard hole, the tool is disconnected from the drive. The piston 31 is moved downwardly by the spring force with the bolt 35 moving in the recess 34, either when the position of the cylindrical sleeve 6 relative to the spindle 1 with its upper edge does not prevent downward movement of the piston 31 or when the spindle 1 is lifted for disengagement with the thread cutting tool. In this way the bolt 35 is locked in its lower position of rotation, i.e., as long as the piston 31 engages around the bolt 35 the bolt is unable to come into engagement with the recesses of the flange 2.

At the same time as the bolt 35 rotates into the horizontal portions 38 of the slots 36, the bolt is forced into the horizontal portions 45 of the slots 43 in the bearing ring 28. As will be seen from FIG. 5, the horizontal portion 45 of the slots 43 lie with their upper defining edge located a slight distance d beneath the upper edges of the horizontal portion 38 of the slots 36, whereby the bearing ring 28 is lifted upwards through a distance d and forces the balls 30 against the outer bearing ring 5 (FIGS. 2 and 6).

As will be evident from the aforegoing, the spindle 1 with the outer bearing ring 5 is driven continuously and the bolt is locked in a position which disengages the tool spindle 11 of the drive. Since the bearing rings 5 and 28 abut the balls 30 in the holder 29, which does not rotate in space, the balls 30 will transmit a rotary movement from the outer bearing ring 5 to the inner bearing ring 28, as will be understood, however, this rotary movement is opposite to the movement of the ring 5. The rotary movement of the bearing ring 28 is transmitted via the pegs 26 to the cylindrical sleeve 6, which transmits the movement via the balls 14 to the thread cutting tool, said rotary movement being reversed in relation to the drive direction of the spindle 1. The thread cutting tool is thus screwed out of the bore. When the thread cutting tool has been removed from the bore and is to be used again to thread a new bore, the apparatus is lowered with the thread cutting tool in the spindle 11 depending from the cylindrical sleeve 6 down towards the bore. The apparatus is lowered to an extent such that the upper portion of the spindle 11, which glides in the sleeve 6, comes into contact with the under surface of the piston 31. Upon continued lowering of the apparatus, the spindle 11 forces the piston 31 upwards until it leaves engagement with the bolt 35. Owing to the fact that all the portions of the apparatus actuating the bolts 35 in this phase of the thread cutting sequence rotate in a direction opposite to the drive direction, as shown by the arrows R, the bolt 35 is moved by friction from the horizontal portions 38 and 45 of the slots 36 and 43 respectively. The bolt 35 is forced upwards by the spring force exerted by the spring 25 on the ring 23, and engages the recesses 4 in the flange 2, whereby the thread cutting tool is again driven in the working direction R.

The aforementioned, illustrated angular deflection of the recess 34 in the piston 31 serves a double purpose. As will be seen from FIGS. 1 and 5, the rear edge of the recess 35 as seen in the direction of rotation R for locking the bolt 35 assists in moving the bolt into the horizontal portions of the slots 36 and 43 respectively, while the front edge of the recess 34 for releasing the bolt 35 assists to move the bolt out of said horizontal portion.

As will be evident from the aforegoing and the drawings, the apparatus of the present invention comprises solely parts which can be readily manufactured by standard operations within the machine industry without the introduction of expensive special tools. Since the apparatus of the invention also comprises but a few parts, in comparison with corresponding known apparatus, manufacturing and selling costs are also relatively low.

Although the invention has been described with reference to a preferred embodiment thereof, it can be modified within the scope of the claims. For example the configuration and length of the grooves and recesses may be varied, whilt it is also possible to use the apparatus in a horizontal position or any other position, or to apply the invention for other purposes similar to thread cutting operations natural to one of normal skill in the art.

The bolt can be made in two coaxial parts and may be provided with bearing rollers located, for example, in the ends engaging the bearing ring 28.

Further, it is not necessary for the thread 17 between the sleeve 6 and the collar sleeve 16 and the threads 20 between the collarlike portion 18 of the sleeve 16 and the cylindrical ring 19 to be at right hand and left hand threads respectively. It is also possible to use right hand and left hand threads respectively, or solely lefthand threads or solely right hand threads. The essential matter is that the ring 19 is lowered simultaneously as the spring force of the spring 25 decreases, and vice versa.

Finally, it is also possible to remove the arm 40 by a simple hand operation, to release the ball holder 29, whereby the apparatus can be used as a conventional non-reversing thread cutting apparatus. This may be of particular advantage in large radial boring machines and vertical boring machines, where it is often difficult to provide a support for the arm 40 and it would thus otherwise be necessary to use a non-reversing thread cutting apparatus.

I claim:

1. A thread cutting apparatus comprising a driving member and a driven member, and torque transmitting means arranged between said members and comprising connecting means for directly driving the driven member in one direction, and intermediate means for driving the driven member in the opposite direction, said intermediate means being journalled for rotation in a holder element which is stationary from the rotation aspect and which moves between mutually opposing roller paths arranged on the driving and the driven member respectively, wherein the connecting means comprises a bolt extending transversely of the axial direction of the apparatus and being arranged for movement in said axial direction of said apparatus and for rotation relative the driving member, and wherein a sleeve extends axially in relation to the driving member and is fixed against axial movement but mounted for rotatable movement, the driven member being arranged in said sleeve for axial movement but locked against rotary movement, the bolt being arranged in one limit position to engage under spring bias in a recess in the driving member and extending to L-shaped slots disposed in the sleeve the slots having first portions extending in the direction of rotation of the driving member and arranged so that, when exceeding a certain resistance of the driven member, the bolt as a result of co-operation between the recesses and the slots is forced to move axially against the spring force out of the recesses and under friction to move into said first portions of respective slots, whereby to disengage the bolt from the driving member and hence disengage said driving member from the driven member, the bolt also being arranged to engage a bearing connected with the driven member and accommodating a roller path, so that when said bolt moves into said portion of respective slots it forces the roller path towards the intermediate means and against a bearing ring which accommodates a second roller path, said bearing ring being arranged at the driving member whereby the driven member is caused to rotate in a direction opposite to that of the driving member.

2. An apparatus according to claim 1, wherein a piston is arranged for axial movement in the sleeve but locked against rotary movement therein, said piston being provided with axially extending recesses in which the bolt is arranged to move, the recesses in the piston, with the bolt in said one limit position, extends through second portions of the slots of the sleeve, which open into one end of the first portions, said slots being generally of L-shape, and engages the recesses in the driving member, extend from the bolt in a direction opposite to the L-shaped slots and are inclined in the direction of rotation of the apparatus so that the piston, when the bolt moves into the legs of respective L-shaped slots, is capable of being moved axially over the bolt, therewith locking the same against rotation out of the first portions or legs of the L-shaped slots.

3. An apparatus according to claim 1, wherein the axial limit position of the bolt in the first portions, or legs of the slots and in relation to the recesses in the driving member can be adjusted by abutment of the bolt on a ring which under the bias of a spring, constantly urges the bolt and which fixably is axially movable in relation to the sleeve.

4. An apparatus according to claim 3, therein a cylindrical ring is rotatably threaded in a further sleeve, which in turn is rotatably threaded in the sleeve, the thread between the cylindrical ring and the further sleeve having a smaller pitch than the thread between the further sleeve and the sleeve.

5. An apparatus according to claim 4, wherein one end of the spring rests against the ring while the other end of the spring rests against the sleeve.

6. An apparatus according to claim 1, wherein the driven member is arranged in the sleeve with a radial clearance and that the driven member and the sleeve are provided with mutually opposing grooves in the form of ball races, each groove in either the driven member or the sleeve presenting in the bottom a leaf spring extending along the groove, balls arranged in the groove being resiliently urged against the grooves opposing the grooves provided with the leaf springs.

7. An apparatus according to claim 1, wherein slots for engagement of the bolt with the first bearing ring are arranged in the ring which, similar to the slot in the sleeve, are of L-shaped configuration with the legs extending in the direction of rotation of the driving member and in which slots the bolt extends.

8. An apparatus according to claim 1, wherein the recesses are arranged in an end surface of the driving member extending transversely of the axial direction of the apparatus, the recesses having a depth corresponding to half the diameter of the bolt.

* * * * *